April 18, 1950     G. B. MOSSIN     2,504,146
ELECTRICAL HEATING DEVICE
Filed Feb. 6, 1940
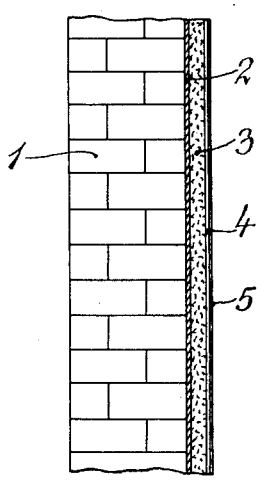
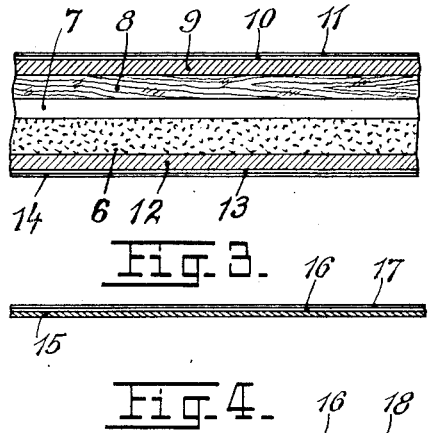
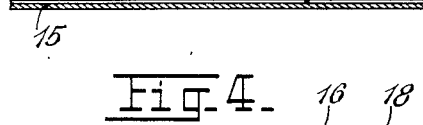
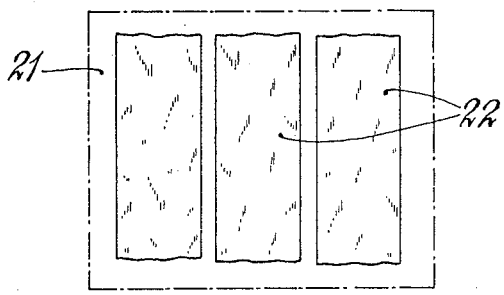
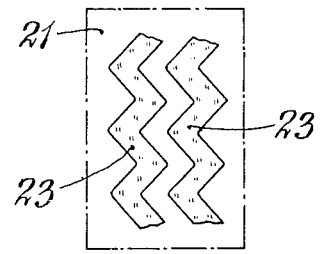
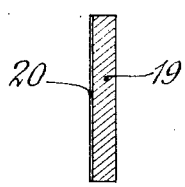
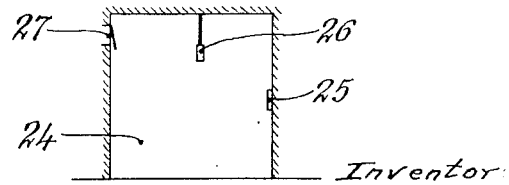
Inventor
G. B. Mossin
By Sterns and Davis
Attys.

Patented Apr. 18, 1950

2,504,146

UNITED STATES PATENT OFFICE 2,504,146

ELECTRICAL HEATING DEVICE

Georg Barth Mossin, Oslo, Norway; vested in the Attorney General of the United States Application February 6, 1940, Serial No. 317,610
In Norway January 16, 1939

Sections 3 and 1, Public Law 690, August 8, 1946
Patent expires January 16, 1959

1 Claim. (Cl. 219—19)

The present invention relates to a device mainly for heating the walls and eventually also the ceiling and/or the floor in rooms by means of electrical current. The device also may be used for other purposes, for instance drying purposes.

The main characteristic feature of the invention is, that the walls and eventually the ceiling and/or the floor of the room or parts of the walls etc. are provided with suitable conductors serving as heating bodies, the conductors being attached directly to the inner surface of the walls etc. or inside the surface, said conductors consisting of resistance wire or metal foil, for instance aluminium foil.

According to the invention the said conductors on the one or both sides may be provided with paper, cloth or the like before the conductors being attached to the wall etc., and the heating bodies thus formed may be covered by a coating of a suitable material. The conductors also may be attached to the hangings or coatings adapted to cover the walls, etc.

For obtaining a great effectivity it is of importance, that the walls etc. outside the conductors are effectively insulated against conduction of heat, the walls etc. before the fitting up of the conductors being provided with one or more coatings of heat insulating material, for instance fibre plates or the like. The conductors, preferably metal foil, also on beforehand may be attached to such insulating plates, and the heating elements thus constructed either may be used as ordinary electric stoves or may be attached to or mounted inside the walls etc. of a room.

A further feature of the invention is, that thermostats are used, by means of which the temperature of the walls etc. automatically is kept higher than the temperature of the air in the room.

Still further important features of the invention will appear from the following description of an embodiment of the device.

In order to describe clearly my invention I will refer to the accompanying diagrammatical drawing, wherein:

Figure 1 shows a vertical transverse section through a wall provided with the present heating device, and Figure 2 shows a vertical transverse section through a floor, this floor also forming the ceiling in the room below.

Figures 3 and 4 show transverse sections through a part of a hanging and paper respectively provided with heating bodies of metal foil.

Figures 5 and 6 show a front view of a part of the inner side of a wall and of a hanging or the like provided with metal foils of different shapes. In these figures the paper etc. fixed to the foils are removed.

Figure 7 shows a section through an insulating plate, the one side of which being provided with metal foil.

Figure 8 shows a section through a room with thermostats adapted to regulate automatically the temperature of the walls and the air respectively.

In Figure 1 the outer masonry wall is indicated by 1, the inner surface of which, facing towards the room, being provided with plastering 2. Inside this plastering is placed a heat-insulating material 3 consisting for instance of suitable insulating wall-boards, say plates of fibre, kivron, cement-asbestos, sea-weed, glass wadding or cork or a combination thereof. Directly on this insulating material are mounted heating bodies 4 consisting for instance of resistance wire passing in suitable windings along the wall. The insulating material eventually may be provided with open grooves, in which the resistance wire is placed. The side of the heating bodies facing towards the room is covered by a thin layer 5 consisting of tapestried hanging, paper-hanging, coating, veneer or the like.

In Figure 2 is shown a floor and ceiling respectively, and 6 indicates the concrete flooring, 7 timber bricks and 8 a wood flooring. This wood flooring is covered by a heat insulating plate 9, on which the heating bodies 10 are placed. These heating bodies are covered by the flooring 11, which may consist of rubber, linoleum, parquetry, pressed fibre plates or the like. Below the concrete flooring 6 is placed an insulating plate 12, to which the heating bodies 13 are attached. These heating bodies may be covered by cardboard, coating or the like 14 forming the inner surface of the ceiling.

The heating bodies eventually may be attached to the said insulating plates before the attachment of the plates to the wall etc., the attachment of the heating bodies to the plates suitable being made in the factory. Thereby the plates will serve as heating elements, which if wanted can be used as ordinary electric stoves. The heating bodies also on beforehand may be attached to the hanging and the floor and ceiling covering respectively, said heating bodies eventually being mounted in grooves pressed in the hanging etc. The attachment may be effected by pasting paper or the like outside the heating bodies.

It will be seen, that when the devices shown in Figures 1 and 2 are used, practically all the heat produced in the heating bodies will be transmitted to the room, the heat transmission outwards through the wall being negligible in relation to the heat transmission to the room. For obtaining a good heat utilization it of course also is important, that the doors and windows are being effectively tightened.

In the above said it is provided, that the walls etc. are especially good insulated by means of fibre plates and the like before the mounting of the heating bodies, such insulation of course being of great importance for obtaining a good heat economy. However, the heating bodies also may be attached directly to the walls etc. already existing. In this case the heat bodies may be attached to a layer consisting of paper, cloth or the like or mounted between two layers before the attachment of the same to the wall etc. After the attachment to the wall the heating elements may be covered by a thin plastering or the like.

Instead of using resistance wire the heating bodies suitably may consist of metal foil of a suitable thickness, for instance foil of aluminium, copper, iron or an alloy. This foil, shaped as suitable sheets or strips, is fixed to the walls etc. or to the hangings or the like and the floor and ceiling covering respectively or also to the insulation plates. Figure 3 shows a section through a hanging 15, to the one side of which the metal foil 16 is fixed by pasting or the like. The foil is covered by paper 17 or the like, which forms the surface facing towards the room. The hanging can be provided with such a foil in the factory.

As shown in Figure 4 the metal foil 16 serving as a heat body may be attached only to a sheet of paper 18. This paper eventually may face towards the wall, and the foil after the attachment to the wall etc. may be covered by hangings, coatings etc.

According to Figure 7, which shows a section through an insulating plate 19, for instance a fibre plate, the heating bodies 20, which suitably may consist of metal foil, are attached to the one side of the plate. In this case the foil may be attached to a layer of paper, cloth or the like or may eventually be enclosed between two layers, whereafter the entire heating body is fixed to the insulation plate. The plates thus will form heating elements, which may be arranged next to each other on the walls etc. The plates also may be arranged without being connected to the walls and thus be used as ordinary panel stoves. In this case both sides of the plates may be provided with metal foil.

As shown in Figure 5 the metal foils 22 attached to the wall, hanging, insulation plate etc. 21, may have a relative great area. The foils also may be shaped as narrow strips 23 as shown in Figure 6, the strips for instance being zigzag-shaped. In Figures 5 and 6 the layer of paper etc., which shall cover the foils, is supposed to be removed.

The conductors serving as heating bodies suitably consist of more sections, which may be connected in series and in parallel as desired. The heating bodies may be connected to any suitable source of current, for instance an ordinary power current network. The voltage in such a network, however, is relatively high, ordinarily about 220 volts, and the heating bodies therefore must be effectively insulated. Owing to this fact it will be of advantage to use a relative low voltage, preferably not exceeding 35 volts, which may be obtained by connecting the heating elements to the secondary side of a suitable transformer, the primary side of which is connected to the current network. More transformers or a transformer with more secondary windings eventually may be used in order to make it possible to vary the voltage. Neither the transformer nor the connections of the heating bodies, however, are shown on the drawing.

By the heating device above described the walls, the ceiling and the floor of a room will be heated, and heat is transmitted to the air in the room. The fact is, however, that the highest feeling of pleasantness is obtained when the temperature of the air in the room is lower than the temperature of the walls etc. In order to obtain a heat distribution corresponding hereto a thermostat 25 may be used, placed for instance on the wall of the room 24, Figure 8, said thermostat only being influenced by the temperature of the wall. This thermostat is adapted to keep the temperature of the walls etc. constant by automatic opening and closing of the current circuit or by variation of the voltage. Besides the thermostat 25 also a thermostat 26 is used which is influenced only by the temperature of the air in the room and is adapted to effect automatically the opening and closing of an air valve 27 or the regulation of a suitable cooling device so as to cause the air temperature to be kept constantly on a lower value than the temperature of the walls etc. A suitable temperature of the walls may be for instance 22° C. and the corresponding air temperature for instance 14° C.

More thermostats placed in different parts of the room eventually may be used, and the thermostats may be of any suitable type.

It will be understood, that many different embodiments of the described device are possible without departing from the scope of my invention as defined by the subjoined claim.

I claim:

An electrical heating unit including an insulating plate, a resistance element, and paper layers underlying and overlying the resistance element relative to the plate, the innermost paper layer serving as a means for securing the resistance element to the plate and the outermost paper layer serving as a protective medium for the resistance element capable of selective decoration.

GEORG BARTH MOSSIN.

REFERENCES CITED

The following references are of record in the file of this patent:

UNITED STATES PATENTS

| Number | Name | Date |
|---|---|---|
| 328,156 | Tucker | Oct. 13, 1885 |
| 449,036 | Capek | Mar. 24, 1891 |
| 636,203 | Helberger | Oct. 31, 1899 |
| 1,359,400 | Lightfoot | Nov. 16, 1920 |
| 1,570,162 | McKeehan | Jan. 19, 1926 |
| 1,742,159 | Hynes | Dec. 31, 1929 |
| 1,766,525 | Maffoni | June 24, 1930 |
| 1,891,595 | Grierson | Dec. 20, 1932 |
| 2,007,610 | Musgrave | July 9, 1935 |
| 2,021,661 | Kisfaludy | Nov. 19, 1935 |
| 2,042,742 | Taylor | June 2, 1936 |
| 2,110,660 | Doczekal | Mar. 8, 1938 |
| 2,138,217 | Sutter | Nov. 29, 1938 |
| 2,165,970 | Jaspers | July 11, 1939 |
| 2,171,977 | Friz | Sept. 5, 1939 |

FOREIGN PATENTS

| Number | Country | Date |
|---|---|---|
| 225,627 | Great Britain | Dec. 8, 1924 |